Patented Dec. 18, 1951

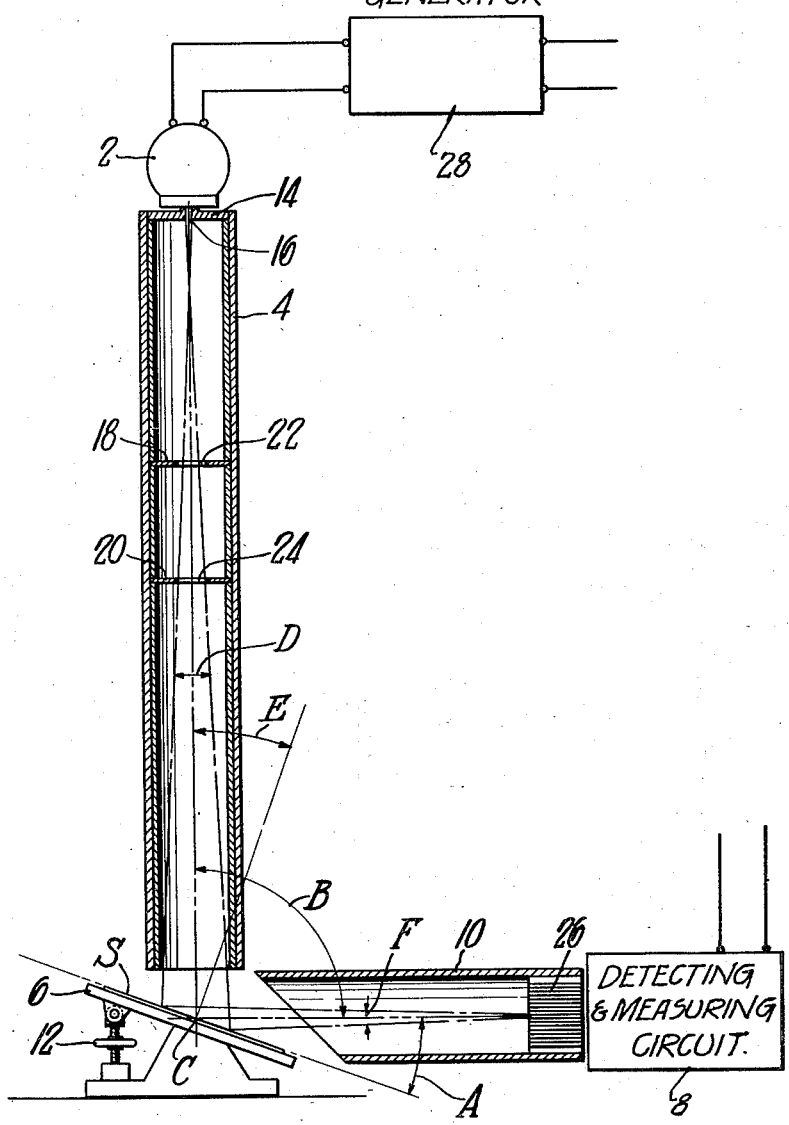

2,578,722

UNITED STATES PATENT OFFICE 2,578,722

APPARATUS FOR DETERMINING COATING THICKNESS

Raymond F. McCartney, George E. Pellissier, and Everett E. Wicker, Pittsburgh, Pa., assignors to United States Steel Company, a corporation of New Jersey Application May 18, 1950, Serial No. 162,632

6 Claims. (Cl. 250—52)

Our invention relates to the determination of coating thickness and more particularly to apparatus for determining the thickness of tin coating on tin plate. Heretofore, the amount of tin in the coating of tin plate has been determined by chemical tests. While chemical tests are accurate they are time consuming and consequently operational control of the tinning equipment is seriously handicapped. Chemical tests also destroy the sample, thus making it impossible to check tests or test for other properties of the sample, thus handicapping research work. It has been suggested that the tin coating weight be determined by an X-ray diffraction method in which the intensity of a characteristic diffraction line from the base metal serves as a quantitative measure of coating thickness. It has been found, however, that this method is limited to cases where the coatings are deposited on a backing material which is sufficiently fine grained and randomly oriented to produce a pure powder pattern under X-ray irradiation. Such ideal conditions are not present in commercial tin plate, and thus this method had proved unsuitable for the determination of the coating thickness of tin plate.

It is an object of our invention to provide apparatus particularly adapted for determining tin coating thickness on tin plate, without destruction of the tin plate sample and in which grain size and orientation of the base and coating materials do not affect the results.

This and other objects will be more apparent after referring to the following specification and attached drawing, in which:

The single figure is a schematic view of the apparatus.

Referring more particularly to the drawing, reference numeral 2 indicates an X-ray tube arranged to direct a primary X-ray beam through a lead lined tube 4 at a tin plate sample S which is mounted on a tiltable table 6. A radiation detector and measuring circuit 8, such as a Geiger counter, photomultipler tube or ionization gage is provided adjacent the sample S on the same side thereof as the tube 2 so as to receive a beam of fluorescent or secondary X-rays emerging from the sample S through a tube 10. In order to maintain a constant D. C. voltage on the detector, a voltage stabilizer is incorporated in the detector and measuring circuit 8. An adjusting screw 12 is provided on the table 6 for changing the emergent angle A between the detector and the sample S independently of the angle B between the detector 8 and the tube 2. If desired, the X-ray tube 2 and detector 8 may be mounted on independent bases pivotally supported at an axis C and provided with separate adjustments whereby the angles A and B can be independently set. A lead shield 14 is provided at the end of the tube 4 adjacent the tube 2 and has a very small aperture 16 therein. The size of this aperture is preferably about 1 mm. x 5 mm. with the long dimension being parallel to the axis of the X-ray tube 2. Also located in the tube 4 are spaced apart lead shields 18 and 20 having openings 22 and 24 therein. Other materials having a high atomic number such as tungsten and molybdenum may be used in place of lead in the shields. The diameters of the openings 22 and 24 and the spacing of the shields 18 and 20 are such that the angle of divergence D of the primary X-ray beam does not exceed 5.5°. The specimen S is arranged so that its surface is perpendicular to a plane defined by the axes of the primary and secondary X-ray beams. The surface of the specimen is also inclined to the axis of the primary beam so that a perpendicular plane to the tin plate surface makes an angle E of 20° with the primary beam. The angle E may be varied from 0 to 80° but it is preferred to maintain this angle between 10 to 30°. For tin plate an angle E of 20° has been found to be best. The fluorescent X-rays to be measured are collimated into a nearly parallel beam as they leave the tin plate. This secondary collimation serves to limit the divergence of the fluorescent X-rays from the tin plate and at the same time controls the area over which the measurement is made. For this reason a collimating device 26 is arranged in the tube 10 at the end thereof adjacent the radiation detector 8. This collimator is preferably a Soller slit system consisting of about 900 thin-walled nickel tubes each $\frac{1}{16}''$ I. D. x $1\frac{1}{2}''$ long, which are closely packed into a circular bundle 2'' in diameter. The axes of the tubes are parallel to the secondary X-ray beam. The internal diameter and length of the tubes are such that the angle of divergence F of the secondary beam is less than 5.0°. Other types of collimators can be substituted for the Soller system as long as they maintain this maximum angle of divergence and permit observation and measurement of the entire area of tin plate over which it is desired to gage tin coating thickness. While it is preferred to have the angle A 20° when measuring the thickness of tin or tin plate this angle may be varied from 15 to 90°, but for most purposes it should be limited to an angle of 15 to 30°.

The X-ray tube 2 is preferably driven by a full wave rectified X-ray diffraction generator 28. In order to maintain the X-ray tube voltage and current constant, a voltage stabilizer is incorporated in the X-ray generator 28. The operating voltage may be between 7 and 30 kvp. but for practical purposes the range should be limited to between 15 and 24 kvp. For tin plate the best range of operating voltages is between 18 and 22 kvp. The operating current may be any value from near 0 to the maximum that can be obtained in an X-ray tube.

The operation of our device as applied to tin plate is as follows:

The apparatus is arranged so that angles A and E are 20°. Since it is desired to measure a circular area of four square inches, the openings 22 and 24 are circular and are preferably 1″ in diameter. The diameters of the openings 22 and 24 and the spacings of shields 18 and 20 are arranged so that the angle of divergence of the primary X-ray beam does not exceed 5.5°. The primary X-ray beam passes through the tin coaing to the ferrous base material and causes the ferrous base to strongly emit characteristic fluorescent X-rays. These fluorescent X-days pass through the tin coaing with part of the X-rays being absorbed. The amount of absorption depends on the thickness of the coating. The remainder of the fluorescent X-ray beam is directed to the radiation detector and measuring circuit 8 which measures the intensity of the fluorescent X-rays emerging from the material being measured. In the event a Geiger counting tube is being used as the radiation detector, the measuring circuit then records the number of counts recorded in a known time interval or the length of time required to accumulate a given count. The number of counts then permits determination of the tin coating weight from a calibration curve which has previously been established by making similar measurements on a series of tin plate samples of different known tin coating weights. The coating weight can be directly indicated by attaching an indicating meter or recorder to the measuring circuit. Alternatively the measuring circuit may be a pulse rate meter whereby an instantaneous measurement of counts is determined which permits instantaneous determination of coating thickness and lends itself to the continuous determination of coating thickness on moving material. The electrical signal from the pulse rate meter can be used in conjunction with suitable electrical circuits to control the operation of the electrolytic plating line. If desired, the equipment can be used to measure the coating thickness on both sides of the strip or tin plate. While the apparatus is particularly adapted for use in measuring the thickness of tin coating or tin plating, it may be used to measure the thickness of other coatings either on steel or other base materials. However, it is necessary that the coating material have a higher atomic number than the base material.

While one embodiment of our invention has been shown and described, it will be apparent that other adaptations and modifications may be made without departing from the scope of the following claims.

We claim:

1. Apparatus for determining the thickness of a coating on a base material in which the coating material has a higher atomic number than the base material, which apparatus comprises an X-ray tube arranged to direct a primary X-ray beam into the base material, a tube extending from said X-ray tube toward and substantially to the base material, a pair of spaced apart transverse shields in said tube intermediate the ends thereof, said shields having aligned openings therein, the diameter of said openings and spacing of said shields being such that the angle of divergence of the primary X-ray beam does not exceed 5.50°, a radiation detector arranged on the same side of the base material as the X-ray tube for detecting fluorescent radiation from the base material, a tube extending from said radiation detector toward and substantially to the base material, a collimating device in said last named tube at the end adjacent said radiation detector, the arrangement of said collimating device being such that the angle of divergence of the secondary X-ray beam does not exceed 5.0°.

2. Apparatus for determining the thickness of a coating on a base material in which the coating material has a higher atomic number than the base material, which apparatus comprises an X-ray tube arranged to direct a primary X-ray beam into the base material, a tube extending from said X-ray tube toward and substantially to the base material, a shield at the end of said tube adjacent said X-ray tube, said shield having an elongated slot therein, a pair of spaced apart transverse shields in said tube intermediate the ends thereof, said shields having aligned openings therein, the size of said slot and openings and the spacing of said shields being such that the angle of divergence of the primary X-ray beam does not exceed 5.5°, a radiation detector arranged on the same side of the base material as the X-ray tube for detecting fluorescent radiation from the base material, a tube extending from said radiation detector toward and substantially to the base material, a collimating device in said last named tube at the end adjacent said radiation detector, the arrangement of said collimating device being such that the angle of divergence of the secondary X-ray beam does not exceed 5.0°.

3. Apparatus for determining the thickness of tin coating on a ferrous base comprising an X-ray tube arranged to direct a primary X-ray beam into the ferrous base, said X-ray tube having an operating voltage of between 18 and 22 kvp., a lead lined tube extending from said X-ray tube toward and substantially to the ferrous base, a pair of spaced apart transverse lead shields in said lead lined tube intermediate the ends thereof, said shields having aligned openings therein, the diameter of said openings and spacing of said shields being such that the angle of divergence of the primary X-ray beam does not exceed 5.5°, a radiation detector arranged on the same side of the ferrous base as the X-ray tube for detecting iron fluorescent radiation, a tube extending from said radiation detector toward and substantially to the ferrous base, a collimating device in said last named tube at the end adjacent said radiation detector, the arrangement of said collimating device being such that the angle of divergence of the secondary X-ray beam does not exceed 5.0°, the angle between the surface of the ferrous base and the primary X-ray beam being between 60 and 80°, the angle between the surface of the ferrous base and the secondary X-ray beam being between 15 and 30°.

4. Apparatus for determining the thickness of tin coating on a ferrous base comprising an X-ray tube arranged to direct a primary X-ray beam into the ferrous base, said X-ray tube having an operating voltage of between 18 and 22 kvp., a lead lined tube extending from said X-ray tube toward and substantially to the ferrous base, a shield at the end of said tube adjacent said X-ray tube, said shield having an elongated slot therein, a pair of spaced apart transverse lead shields in said lead lined tube intermediate the ends thereof, said shields having aligned openings therein, the size of said slot and openings and the spacing of said shields being such that the angle of divergence of the primary X-ray beam does not exceed 5.5°, a radiation detector arranged on the same side of the ferrous base as the X-ray tube for detecting iron fluorescent radiation, a tube extending from said radiation detector toward and substantially to the ferrous base, a collimating device in said last named tube at the end adjacent said radiation detector, the arrangement of said collimating device being such that the angle of divergence of the secondary X-ray beam does not exceed 5.0°, the angle between the surface of the ferrous base and the primary X-ray beam being between 60 and 80°, the angle between the surface of the ferrous base and the secondary X-ray beam being between 15 and 30°.

5. Apparatus for determining the thickness of tin coating on a ferrous base comprising an X-ray tube arranged to direct a primary X-ray beam into the ferrous base, said X-ray tube having an operating voltage of between 18 and 22 kvp., a lead lined tube extending from said X-ray tube toward and substantially to the ferrous base, a pair of spaced apart transverse lead shields in said lead lined tube intermediate the ends thereof, said shields having aligned openings therein, the diameter of said openings and spacing of said shields being such that the angle of divergence of the primary X-ray beam does not exceed 5.5°, a radiation detector arranged on the same side of the ferrous base as the X-ray tube for detecting iron fluorescent radiation, a tube extending from said radiation detector toward and substantially to the ferrous base, a collimating device in said last named tube at the end adjacent said radiation detector, the arrangement of said collimating device being such that the angle of divergence of the secondary X-ray beam does not exceed 5.0°, the angle between the surface of the ferrous base and the primary X-ray beam being 70°, the angle between the surface of the ferrous base and the secondary X-ray beam being 20°.

6. Apparatus for determining the thickness of tin coating on a ferrous base comprising an X-ray tube arranged to direct a primary X-ray beam into the ferrous base, said X-ray tube having an operating voltage of between 18 and 22 kvp., a lead lined tube extending from said X-ray tube toward and substantially to the ferrous base, a shield at the end of said tube adjacent said X-ray tube, said shield having an elongated slot therein, a pair of spaced apart transverse lead shields in said lead lined tube intermediate the ends thereof, said shields having aligned openings therein, the size of said slot and openings and the spacing of said shields being such that the angle of divergence of the primary X-ray beam does not exceed 5.5°, a radiation detector arranged on the same side of the ferrous base as the X-ray tube for detecting iron fluorescent radiation, a tube extending from said radiation detector toward and substantially to the ferrous base, a collimating device in said last named tube at the end adjacent said radiation detector, the arrangement of said collimating device being such that the angle of divergence of the secondary X-ray beam does not exceed 5.0°, the angle between the surface of the ferrous base and the primary X-ray beam being 70°, the angle between the surface of the ferrous base and the secondary X-ray beam being 20°.

RAYMOND F. McCARTNEY.
GEORGE E. PELLISSIER.
EVERETT E. WICKER.

REFERENCES CITED

The following references are of record in the file of this patent:

UNITED STATES PATENTS

| Number | Name | Date |
| --- | --- | --- |
| 1,909,118 | Raab | May 16, 1933 |
| 2,079,900 | Cohn | May 11, 1937 |
| 2,449,066 | Friedman | Sept. 14, 1948 |
| 2,521,772 | Beeghly | Sept. 12, 1950 |